United States Patent
Jorgenson et al.

(10) Patent No.: US 12,532,272 B2
(45) Date of Patent: Jan. 20, 2026

(54) TRANSMISSION DIVERSITY FOR ALE NETWORKS

(71) Applicant: Rockwell Collins, Inc., Cedar Rapids, IA (US)

(72) Inventors: Mark B. Jorgenson, Kanata (CA); Andrew Kamel, Stittsville (CA); Robert W. Johnson, Ottawa (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 344 days.

(21) Appl. No.: 18/233,796

(22) Filed: Aug. 14, 2023

(65) Prior Publication Data

US 2025/0063519 A1 Feb. 20, 2025

(51) Int. Cl.
*H04W 56/00* (2009.01)
*H04L 5/00* (2006.01)

(52) U.S. Cl.
CPC ......... *H04W 56/001* (2013.01); *H04L 5/0048* (2013.01); *H04W 56/0065* (2013.01)

(58) Field of Classification Search
CPC ........... H04W 56/001; H04W 56/0065; H04W 56/0015; H04W 56/006; H04W 76/10; H04W 56/0045; H04L 5/0048
See application file for complete search history.

(56) References Cited

U.S. PATENT DOCUMENTS

| | | | |
|---|---|---|---|
| 7,180,970 B1 | 2/2007 | Warnagiris et al. | |
| 7,792,498 B2 | 9/2010 | Tsfaty et al. | |
| 8,711,732 B2 | 4/2014 | Johnson | |
| 2016/0270115 A1* | 9/2016 | Mukkavilli | H04L 5/0055 |
| 2017/0236390 A1* | 8/2017 | Herschkowitz | G16H 20/17 |
| | | | 340/539.12 |

FOREIGN PATENT DOCUMENTS

| | | |
|---|---|---|
| AU | 1996059723 A1 | 6/1996 |
| CN | 112654057 A | 4/2021 |
| EP | 1661268 B1 | 12/2013 |

* cited by examiner

Primary Examiner — Kyaw Z Soe
(74) Attorney, Agent, or Firm — Suiter Swantz IP

(57) ABSTRACT

In a system for establishing connectivity in a HF ALE cellular network, stations are organized to sound each channel, synchronized to every other station in the network. All stations make identical sounding transmissions using a single address, synchronized such that the differential timing within the coverage area remains within the mobile radios' delay spread capability. Synchronized soundings allow the mobile radio to consistently connect to the best available channel. The stations may be synchronized via a central control function. Alternatively, the stations may perform soundings based on a predetermined schedule. Where the propagation time to the mobile radio is known, or determinable within some threshold, the stations may apply a delay to the sounding transmissions to ensure that the sounding transmissions from each of the stations reaches the mobile radio at the same time within some acceptable margin.

20 Claims, 4 Drawing Sheets

TRANSMISSION DIVERSITY FOR ALE NETWORKS

BACKGROUND

High Frequency (HF) Automatic Link Establishment (ALE) systems are routinely used to simplify the setup of radio links between HF stations relying on ionospheric propagation for communication. The ionosphere changes over time, resulting in different frequencies propagating between two distant stations at different times. ALE systems automate the process of establishing connectivity between stations by having an agreed upon list of potential frequencies or channels, and then conduct an initial exchange of data between the stations. When possible, the ALE finds a usable channel and determines the quality of the link on that channel. There are several standardized HF ALE systems. All operate by having the calling station select a channel from the agreed upon list, make a linking call, and then wait for a response from the station being called (the responder). If the called station hears the linking call, it sends a response to the caller. If the caller hears the responder, the stations are linked (though in some cases a third leg is required in the initial handshake). If the initial call attempt fails because either the responder or the caller fails to receive the transmission from the other station, the caller will try again, usually on a different channel from the agreed upon list, and repeat the process until the link is made.

An extension to the concept of the HF ALE systems that is currently deployed is dubbed HF Cellular. In HF Cellular systems, a network of HF Cellular stations are tied together with a communication linkage that allows them to coordinate responses to link establishment requests from the mobile users that the Cellular network supports. Rather than call any of the individual stations in the HF Cellular network, mobile users use an address that designates the HF Cellular network in their calling request. Upon receipt of such a call, the HF Cellular network examines the quality of the signal at every station which received the request and, based on the received signal, designates a single station (typically the station with the best received signal quality) to respond to the caller. From that point on, the ALE exchange proceeds as would any usual ALE link setup.

One mechanism for ensuring that mobile stations have information on the quality of the channel for each frequency to individual stations is to have stations sound, making defined short transmissions on each of the channels to allow receivers to evaluate the signal to noise ratio on every channel in the agreed upon list for signals from the station that is sounding. When the mobile radio hears the sound, it stores the quality of each channel in a link quality analysis (LQA) table, identifying the time of the reception, the channel and the originating station. It is desirable for HF Cellular ALE systems to operate with any vendor's radio that complies to the standards governing the ALE in use. This results in less than optimum operation when considering calls being initiated by mobile nodes, relying on knowledge of the quality of signal path for each of the channels in use to each of the stations in the HF Cellular network.

For simplicity, radio stations within the Cellular ALE infrastructure network will be referred to as "fixed" while radios that are being served by the ALE infrastructure network will be referred to as "mobile". However, it should be noted that it is possible for Cellular ALE stations to be mobile if wireless infrastructure is used to tie those ALE stations into the Cellular network, and the Cellular ALE network can provide services to fixed sites that do not have connectivity to network infrastructure.

If the HF cellular system is configured with a single address for all stations, the data for sounding by any station in the network will be stored in the same entry in the LQA table. Data from more recent soundings will be given greater weight than older sounds with the result that the connectivity to whichever station has sounded most recently will dominate the choice of channel for mobile radios. In some instances, a much better channel may be available to a station which has not made one of the most recent sounds and for which the stations which have sounded recently have poor connectivity. Note that while it would be possible to change the mobile radios behavior to associate sounds from individual stations in the network with both their individual address and the address of the HF Cellular network, this would require changes to vendor radios which defeats the simplicity inherent in the HF Cellular approach.

It would be advantageous to have a system and method for HF ALE cellular networking that provided reliable connectivity to the best available channel in the network both for calls initiated by mobile nodes and for calls from the HF Cellular network.

SUMMARY

In one aspect, embodiments of the inventive concepts disclosed herein are directed to a system and method for establishing connectivity in a HF ALE cellular network. Stations are organized to sound each channel, synchronized to every other station in the network. All stations make identical sounding transmissions using a single address, synchronized such that the differential timing within the coverage area remains within the mobile radios' delay spread capability (a measure of what differential delay on multipath signals can be tolerated). Synchronized soundings allow the mobile radio to consistently determine the connectivity to the HF Cellular network on each channel for all of the stations participating in the sounding transmissions.

In a further aspect, the stations may be synchronized via a central control function. Alternatively, the stations may perform soundings based on a predetermined schedule.

In a further aspect, where the location of the mobile radio (or radios) is/are known, or determinable within some threshold, or where the relative propagation times to the mobile station can be determined to within some threshold, the stations may apply a differential delay to the sounding transmissions to ensure that the sounding transmissions from each of the stations remains within the delay spread capacity of the mobile radio(s).

In a further aspect, where calls are initiated by the cellular network, multiple stations may synchronize the link setup transmission to be emitted at the same time. Alternatively, or in addition, where calls are initiated by the mobile radio, multiple stations may synchronize the link setup response transmission.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
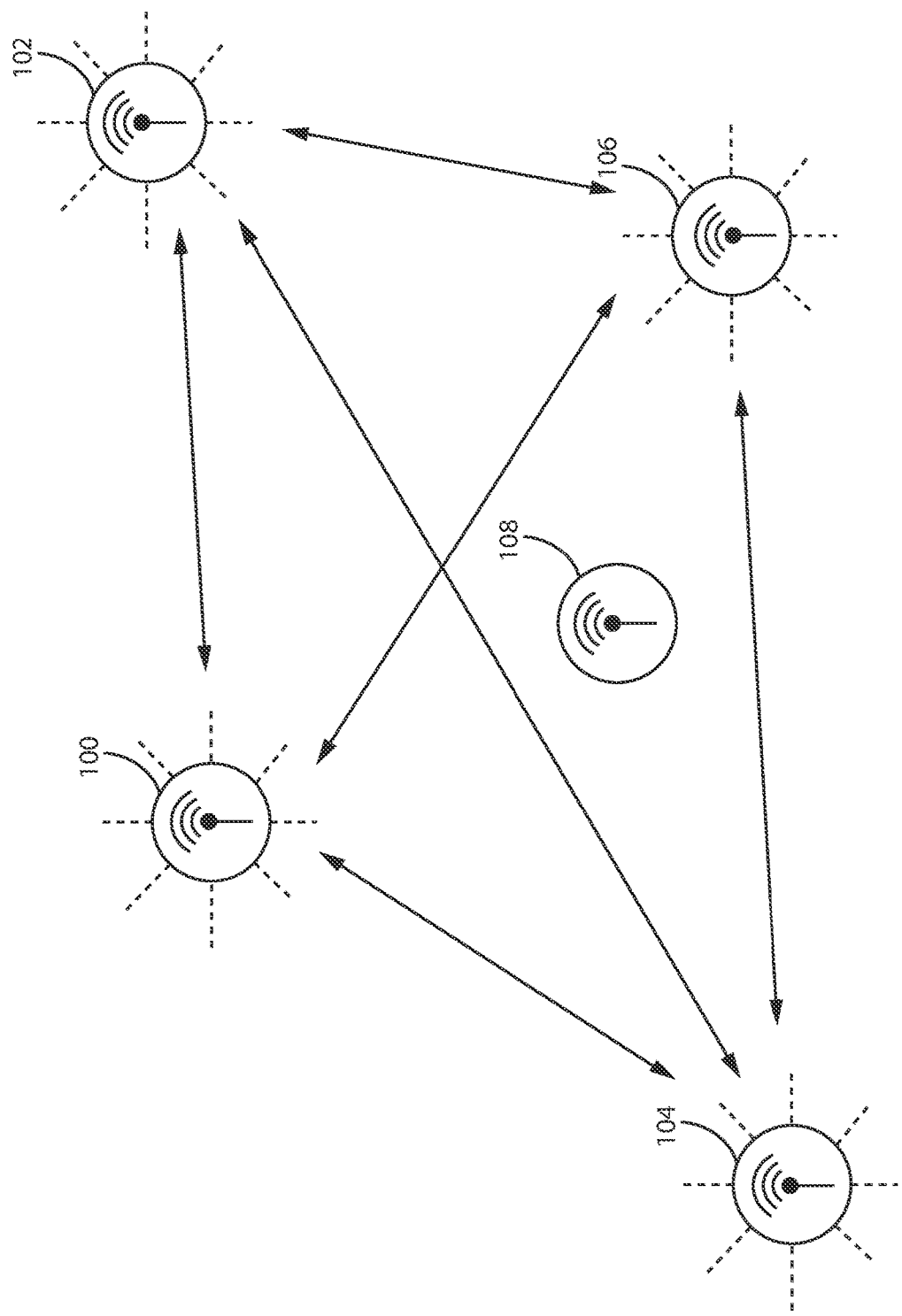
FIG. 1 shows a block diagram of a system of nodes in a cellular network according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for establishing connectivity in a HF ALE cellular network. Stations are organized to sound each channel, synchronized to every other station in the network. All stations make identical sounding transmissions using a single address, synchronized such that the differential timing within the coverage area remains within the mobile radios' delay spread capability. Synchronized soundings allow the mobile radios to receive signals from all of the stations concurrently on the same channel. This approach reduces the overhead associated with sounding because there is no need for each station to sound individually. More importantly, the simultaneous sounding allows the mobile radios to correctly identify which frequencies provide the best links from the HF cellular network and store that information in the mobile radios' link quality analysis (LQA) tables. In contrast, when stations sound individually, the connectivity (or lack of connectivity) from stations that have sounded more recently has the effect of changing the mobile radios' evaluation of channels that may offer better connectivity to the HF cellular network. The stations share a central control function which directs which station will respond to any particular call into the network. That same central control function may also coordinate the synchronization of the sounding by multiple stations within the cellular network. Alternatively, the stations may perform soundings based on a predetermined schedule. Where the location of the mobile radio is known, or determinable within some threshold, the stations may apply a differential delay to the sounding transmissions to ensure that the sounding transmissions from each of the stations reaches the mobile radio at the same time within some acceptable margin.

Referring to FIG. 1, a block diagram of a system of nodes 100, 102, 104, 106 in a cellular network according to an exemplary embodiment is shown. The system includes a plurality of stations 100, 102, 104, 106, which are in communication with one another or with a central control function; each station 100, 102, 104, 106 may be configured to establish radio communication with one or more mobile radios 108 (mobile node 108) via one of a plurality of channels. Traditionally, the mobile radios 108 may be periodically receiving sounding transmissions from the stations 100, 102, 104, 106 and maintain a LQA table associate with a specific address of the corresponding station 100, 102, 104, 106. The mobile radio 108 may then establish a link with whichever station 100, 102, 104, 106 offers the best link quality.

Where the system embodies an HF cellular ALE network, each station 100, 102, 104, 106 utilizes the same address. Link quality data is time sensitive as the quality of links can change with time. Because of this, more recent receptions will be weighted more strongly than older receptions in evaluating the quality of a reception from any specific station. As a result, if the stations in the cellular network transmit sounding signals with an address associated with the network, mobile nodes will give higher weight to sounds that have been received most recently, even if from a station that has poor connectivity. That may result in avoiding the best channel for the mobile radio to reach the network because it offered poor connectivity in the more recent sounding transmissions from other stations. Without a means to accurately evaluate the links between station 108 and stations 100, 102, 104, and 106, it is likely that a sub-optimal channel choice will be made a large proportion of the time.

In at least one embodiment, the stations 100, 102, 104, 106 are configured to perform a synchronized sounding such that the mobile radio 108 has current link quality data, giving the mobile radio 108 the best possible data pertaining to connectivity to the network of stations participating in the sounding transmission by the cellular network. Such methodology permits the mobile radio 108 to select the channel (e.g., frequency) that is best from an overall network perspective, rather than the best channel to reach an individual station (which may not have been a good choice overall).

Synchronized sounding by all of the stations 100, 102, 104, 106 requires precise control of the timing of the sounding transmissions; furthermore, the signal being transmitted by all stations 100, 102, 104, 106 participating in the sounding should be identical. In at least one embodiment, a central function coordinates all of the stations 100, 102, 104, 106 to perform a sounding at the same time. Alternatively, each station 100, 102, 104, 106 may be configured to perform soundings periodically based on some centralized clock, or an internal clock that is periodically synchronized, provided such periodic soundings occur at the same time.

In at least one embodiment where the stations 100, 102, 104, 106 know or can determine a relative distance to the mobile radio(s) 108, each station 100, 102, 104, 106 may apply a delay to the sounding transmission. Individualized delays may compensate for propagation time such that the sounding transmissions from each station 100, 102, 104, 106 arrive at the mobile radio 108 within a timing window defined by a tolerated differential multipath delay of the ALE system. When servicing multiple mobile radios 108, the mobile radios 108 may be in a general area, allowing computation of propagation delays (minimum and maximum) to the boundaries of the area of interest.

In at least one embodiment, where calls are initiated by the cellular network attempting to establish connectivity to a mobile radio 108, the centralized function will select at least two of the stations and synchronize the link setup transmission by the at least two of the stations so that the same link setup transmission is emitted at the same time by all of the stations transmitting the link setup call. Where the stations 100, 102, 104, 106 know or can determine a relative distance to the mobile radio 108, each station 100, 102, 104, 106 may apply a delay to the link setup calling transmission. Individualized delays may compensate for propagation time such that the link setup calling transmissions from each station 100, 102, 104, 106 arrive at the mobile radio 108 within a window defined by a tolerated differential multipath delay of the ALE system.

In at least one embodiment, where calls are initiated by the mobile radio 108, the centralized function will examine the link quality metrics of the signals received at each station 100, 102, 104, 106, and based on that information will select at least two of the stations to synchronize the link setup response transmission by the at least two of the stations so that the same link setup response transmission is emitted at the same time by all of the stations transmitting the link setup response. Where the stations 100, 102, 104, 106 know or can determine a relative distance to the mobile radio 108, each station 100, 102, 104, 106 may apply a delay to the link setup response transmission. Individualized delays may compensate for propagation time such that the link setup response transmissions from each station 100, 102, 104, 106 arrive at the mobile radio 108 within a window defined by a tolerated differential multipath delay of the ALE system.

Figure 2:
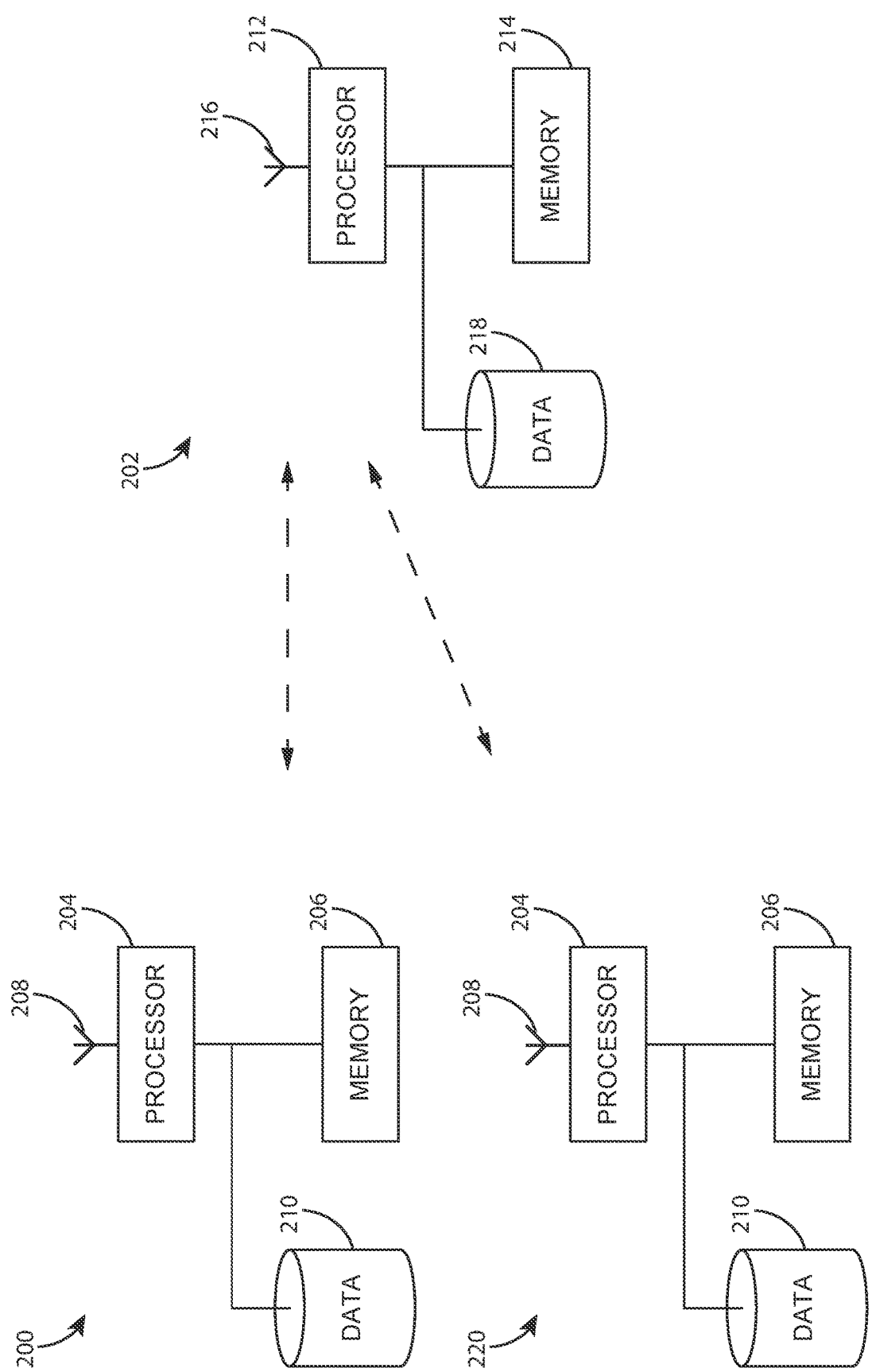
FIG. 2 shows block diagram of stations and a mobile radio suitable for implementing an exemplary embodiment.

Referring to FIG. 2, block diagram of stations 200, 220 and a mobile radio 202 suitable for implementing an exemplary embodiment is shown. Each station 200, 220 includes a processor 204 (or processing hardware sufficient to implement radio and network functionality) configured via processor executable code stored in a non-transitory memory 206, and one or more antennas 208 to establish a connection to the mobile radio 202.

The mobile radio 202 includes a processor 212 configured via processor executable code stored in a non-transitory memory 214 to establish a connection to with a station 200, 220 in an HF ALE network via one or more antennas 216. The mobile radio 202 may include a data storage element 218 in data communication with the processor 212 to store a LQA table of quality metrics for various channels in the network.

In at least one embodiment, when the mobile radio 202 attempts to establish a connection with a station 200, 220, the mobile radio 202 uses LQA data that is derived from each station 200, 220 having previously transmitted an identical sounding signal on each of the available channels and received by the mobile radio. The mobile radio 202 may receive the identical sounding signals and identify the best channel of all available channels to establish a connection.

In at least one embodiment, a centralized function within the network synchronizes the sounding signals of the stations 200, 220. Alternatively, or in addition, each station 200, 220 may utilize a separate internal clock and a set of criteria for generating a sounding signal such that each station 200, 220 will generate the sounding signal at the same time. Internal clocks may be periodically synchronized with other stations 200, 220 on the network.

In at least one embodiment, each station 200, 220 may record the relative or absolute locations of other stations 200, 220 and any mobile radios 202, and or other means to determine the differential propagation time between fixed stations and mobile stations, within the network in a data storage element 210. When a synchronized sounding is initiated, each station 200, 220 may determine if a sounding signal should be delayed by some amount based on different distances between the mobile radio 202 and each station 200, 220. In at least one embodiment, the station 200, 220 further from the mobile radio 202 would transmit first with other stations 200, 220 delaying transmission by a time to account for propagation time disparity among the stations 200, 220. Such delays may be calculated by each station 200, 220 or by a central function of the network.

Figure 3A:
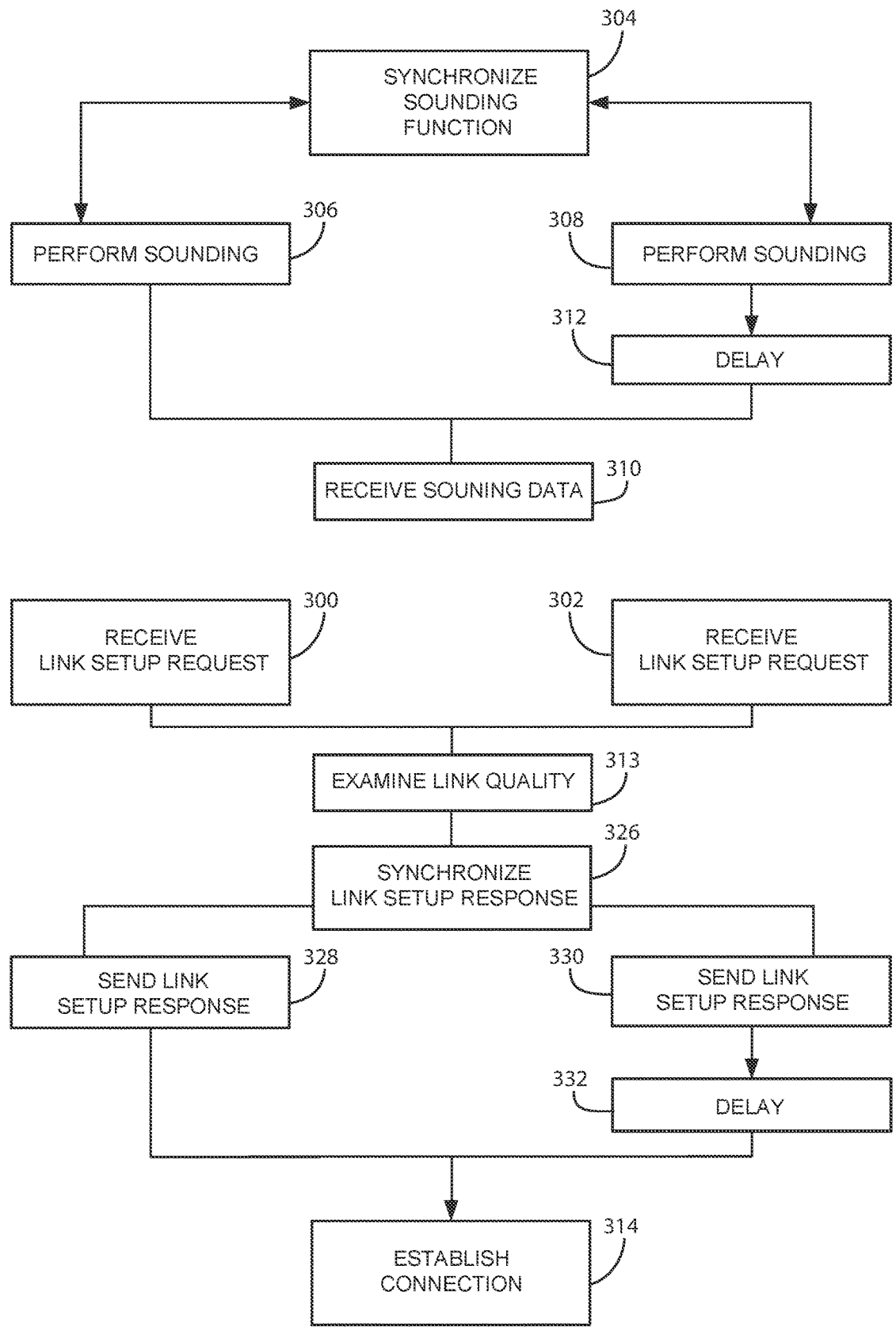
FIG. 3A shows a flowchart of a method establishing connectivity in a cellular network according to an exemplary embodiment.
Figure 3B:
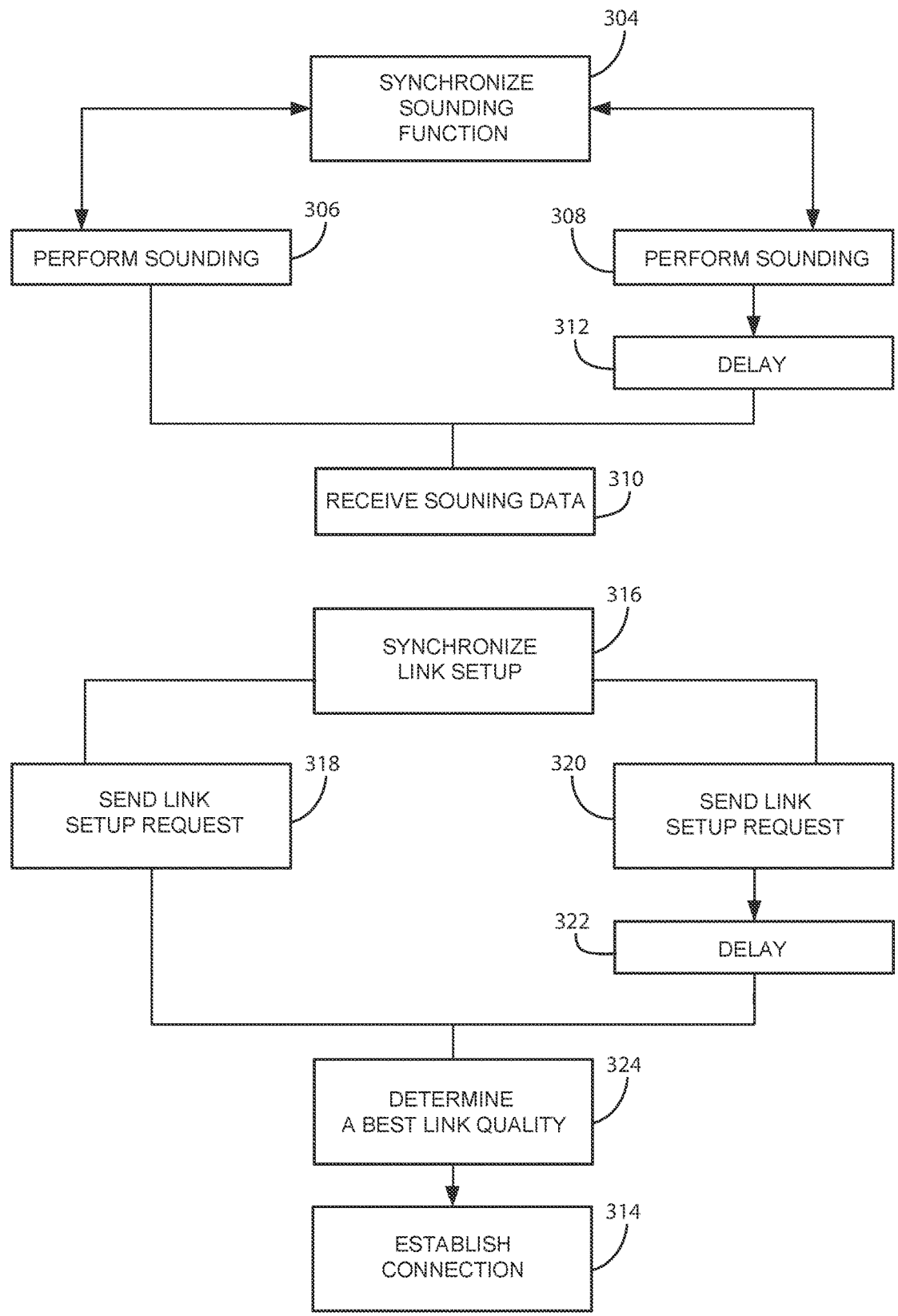
FIG. 3B shows a flowchart of a method establishing connectivity in a cellular network according to an exemplary embodiment.

Referring to FIGS. 3A-3B, flowchart of methods establishing connectivity in a cellular network according to an exemplary embodiment are shown. When a mobile radio attempts to establish a connection, it would be advantageous to connect to the station with the best signal quality. With most radio systems, signal quality is correlated with proximity, but for HF ALE systems using ionospheric propagation, stations further from the mobile radio may provide a better signal.

In at least one embodiment, stations periodically synchronize 304 a sounding transmission and broadcasts 306, 308 identical sounding signals using a single address. Synchronization may be via a central function initiating the sounding signal simultaneously for each station, or a synchronized clock in each station. The sounding signals provide mobile radios with a relatively current idea of which channels are available/highest quality. Synchronized 304 sounding signals allow mobile radios to determine which frequency or channel is most likely to give the best results in reaching the cellular ALE network, regardless of proximity, and store the results in an LQA table.

In at least one embodiment, the stations may apply a delay 312 to the sounding signal based on the propagation time from the individual stations to the mobile radio or on known locations of other stations in the network, and the known location of the mobile radio. The delay 312 is configured to ensure that the sounding signals from all stations transmitting the sounding signal arrives at the mobile radio within a threshold window as defined by the ALE network and mobile radio delay spread capability.

When the mobile radio attempts to connect to the network, each station receives 300, 302 a request to initiate a connection by the mobile calling the common address. A central function of the network evaluates 313 the quality of the reception from the mobile radio. In at least one embodiment, the centralized function may examine various link quality metrics of the signals received at each station, and based on that information select at least two of the stations to synchronize 326 the link setup response transmission so that the same link setup response transmission is emitted 328, 330 at the same time by all of the stations transmitting the link setup response. The station with the best connection may then set up the link 314. In at least one embodiment, one or more stations may apply a delay 332 to the link setup response based on propagation time to ensure the link setup responses from all stations arrive at the mobile radio within a threshold window as defined by the ALE network and mobile radio delay spread capability.

If the original transmission is originating from the HF Cellular network as opposed to the mobile radio, the original transmission may be a diversity transmission with multiple transmitters synchronized 316 to transmit an initial link setup request 318, 320. In at least one embodiment, one or more stations may apply a delay 322 to the link setup request based on propagation time to ensure the link setup requests from all stations arrive at the mobile radio within a threshold window as defined by the ALE network and mobile radio delay spread capability. If a number of transmitters are available, and they all make those synchronized 316 initial transmissions, the mobile radio will respond to the network on the channel that it receives the link setup call. All of the stations in the cellular network will share the quality of the reception and a centralized function will determine 324 the best station to setup the link 314 with the mobile radio. When the call from the designated fixed station reaches the mobile radio the link is established.

With conventional sounding, if HF ALE cellular is configured with a single address for all stations, the data for sounding by any station in the network will largely reflect connectivity to whichever HF ALE cellular station has sounded most recently. As a result, choice of channel by the mobile radio will largely be based on the link to that station. Embodiments of the present disclosure enable the best possible look at the connectivity to an HF ALE cellular network to choose the frequency that is best from an overall network perspective, not the best frequency to reach an individual station. By implementing a diversity sounding with all stations sounding at the same time, the mobile radio is more likely to pick the best channel available.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus embodied in a station of an ALE cellular network comprising:
   one or more transmitters; and
   at least one processor in data communication with the one or more transmitters and a memory storing processor executable code for configuring the at least one processor to:
   synchronize transmission of a sounding signal with other stations in the ALE cellular network, the sounding signals for each station being identical;
   generate the sounding signal; and
   transmit the sounding signal.

2. The computer apparatus of claim 1, wherein the transmission of the sounding signal is synchronized via a central function of the ALE cellular network.

3. The computer apparatus of claim 1, wherein the transmission of the sounding signal is synchronized via a predetermined schedule with timing common to all stations in the ALE cellular network.

4. The computer apparatus of claim 1, wherein the transmission of the sounding signal is synchronized such that differential timing within a coverage area is within a delay spread capability of the radios receiving the signal as defined by a known disposition of stations in the ALE cellular network.

5. The computer apparatus of claim 4, wherein the at least one processor is further configured to:
   determine a delay to apply to the transmission of the sounding signal based on the known disposition of stations and a known propagation time to the mobile radio; and
   apply the delay to the transmission of the sounding signal.

6. The computer apparatus of claim 5, wherein the at least one processor is further configured to coordinate with other stations in the ALE cellular network to determine the delay for the transmission of each sounding signal within a target area.

7. A method for establishing a connection in an HF ALE cellular network comprising:
   synchronizing transmission of an initial link setup request within a plurality of stations in the HF ALE cellular network;
   receiving at least one response to the synchronized transmission; and
   identifying a station with a best connection.

8. The method of claim 7, wherein the transmission of the initial link setup request is synchronized via a central function of the ALE cellular network.

9. The method of claim 7, further comprising sharing quality metrics associated with responses from each station, wherein identifying the station with the best connection includes reference to the quality metrics.

10. The method of claim 7, wherein the transmission of the initial link setup request is synchronized such that differential timing within a coverage area is within a delay spread capability as defined by a known disposition of stations.

11. The method of claim 10, further comprising:
  determining a delay to apply to the transmission of the initial link setup request based on the known disposition of stations and a known propagation time to the mobile radio; and
  applying the delay to the transmission of the corresponding initial link setup request.

12. The method of claim 11, further comprising coordinating with other stations in the ALE cellular network to determine the delay for the transmission of each initial link setup request within a target area.

13. The method of claim 7, further comprising optimizing a time distribution of multipath signals corresponding to the initial link setup requests, received at the mobile radio addressed by the initial link setup requests.

14. An HF ALE cellular system comprising:
  a plurality of stations, each comprising:
    one or more transmitters; and
    at least one processor in data communication with the one or more transmitters and a memory storing processor executable code for configuring the at least one processor to:
      receive an initial link setup request from a mobile radio;
      identify a plurality of stations with best connections to the mobile radio;
      synchronize transmission of a response to the initial link setup request by the plurality of stations; and
      establish a connection via the plurality of stations with the best connection.

15. The HF ALE cellular system of claim 14, wherein the transmission of the response to the initial link setup request by the plurality of stations is synchronized via a central function of the ALE cellular network.

16. The HF ALE cellular system of claim 14, wherein the at least one processor is further configured to share quality metrics associated with the initial link setup request from each station, and identifying the plurality of stations with a best connection includes reference to the quality metrics.

17. The HF ALE cellular system of claim 14, wherein the transmission of the response by the plurality of stations to the initial link setup request is synchronized such that differential timing within a coverage area is within a delay spread capability as defined by a known disposition of stations.

18. The HF ALE cellular system of claim 14, wherein the at least one processor is further configured to:
  determine a delay to apply to the transmission of each response to the initial link setup request based on the known disposition of stations and a known propagation time to the mobile radio; and
  apply the delay to the transmission of the corresponding response to the initial link setup request.

19. The HF ALE cellular system of claim 18, wherein the at least one processor is further configured to coordinate with other stations in the ALE cellular network to determine the delay for the transmission of each response to the initial link setup request within a target area.

20. The HF ALE cellular system of claim 14, wherein the at least one processor is further configured to optimize a time distribution of multipath signals corresponding to the responses to the initial link setup request, received at the mobile radio initiating the initial link setup request.

* * * * *